United States Patent Office 3,467,348
Patented Sept. 16, 1969

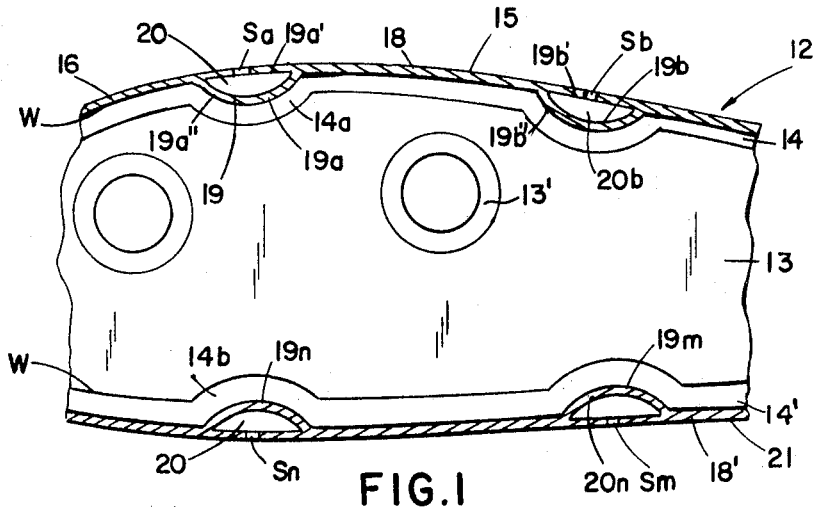
FIG.1
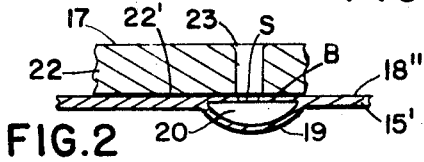
FIG.2
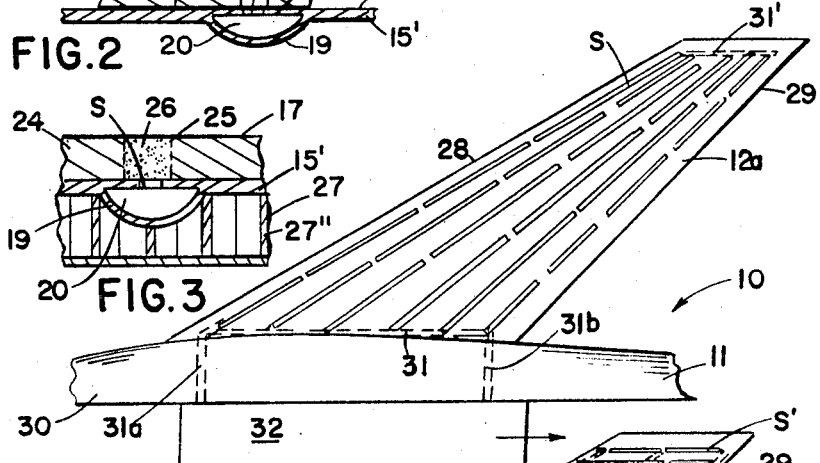
FIG.3
FIG.4
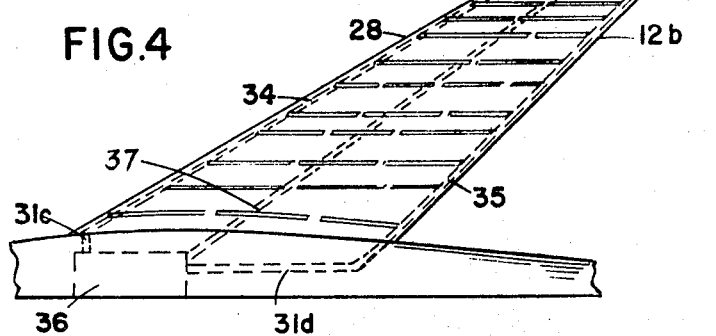
FIG.5
*INVENTOR.*
JEROME H. LEMELSON

3,467,348
AIRCRAFT STRUCTURES AND SYSTEMS
Jerome H. Lemelson, 85 Rector St.,
Metuchen, N.J. 08840
Continuation-in-part of application Ser. No. 432,924,
Jan. 8, 1965. This application Oct. 10, 1967, Ser.
No. 674,312
Int. Cl. B64c *1/38, 3/38;* B23p *15/26*
U.S. Cl. 244—130                              10 Claims

ABSTRACT OF THE DISCLOSURE

Structures in aircraft components particularly lifting surfaces such as wings, are provided together with either or both of two systems both of which employ slotted openings in the flight surfaces. In a first system, the control of flow of boundary layer air flowing over the flight surface is effected by drawing the air of the boundary layer into the wing through slots provided therein and ejecting said air rearwardly to provide thrust or utilizing same to improve combustion in the aircraft's jet engine. In a second system, the same or auxiliary slotted openings in the wing or other flight surface are utilized to expel a heat transfer fluid onto the surface of the wing for the transpirational cooling thereof during high speed flight to protect the material thereof from heat damage and destruction during supersonic or hypersonic flight through the atmosphere.

The structures employ sheets of metal as the skin of the aircraft or substrate therefore, which sheets contain conduit or duct formations provided integral with the sheets thereby greatly simplifying the structure and labor required to assemble the wing.

Related applications

This is a continuation-in-part of application Serial Number 432,924, filed Jan. 8, 1965, for Ducted Panelling and Articles, now U.S. Patent 3,346,220 which is copending herewith and has as a parent application Ser. No. 641,101 filed Feb. 19, 1957, now U.S. Patent 3,173,195, and Ser. No. 304,165 filed Aug. 23, 1963.

Summary

The instant invention relates to aircraft structures containing flight surfaces requiring boundary layer control and/or temperature control at high speed flight through the atmosphere. In particular, the invention is directed to improve constructions of aircraft wings and bodies having narrow slotted openings therein and a system for drawing air into the wing to control the boundary layer and/or ejecting a heat transfer fluid through said opening for cooling the flight surface.

It is known in the art to provide openings in an aircraft skin for the intake of air from the flight stream for the purpose of providing air to a jet engine. U.S. Patent 2,742,247 provides spanwise extending strips of porous material as part of the aircraft skin and complex assemblies of corrugated members, plates and channels which are rivet assembled to the aircraft wing skin and frame for boundary layer flow control. However, such assemblies are relatively costly not only because of their complexity due to the multiple components but also because of the assembly labor required to rivet the components together and to the aircraft skin and frame. Furthermore, sealing of the system components after assembly is required adding to the labor and weight costs. The weight of such assemblies is also such as to substantially reduce the payload of the aircraft and increase maintenance costs.

It is accordingly a primary object of this invention to provide new and improved structures in aircraft components such as wings and tail surfaces having means for flowing fluids through said components relative to the boundary layer or flight stream of the aircraft.

Another object is to provide new and improved aircraft flight structures having slotted flight skin portions and a fluid conducting system which is light in weight and extremely simple in structure.

Another object is to provide improved wing structures capable of boundary layer control whereby the skin of the wing serves both as a flight surface and fluid conducting means as well as a load bearing means without the need to assemble a plurality of members such as channels thereto.

Another object is to provide a method for making slotted aircraft wing panels or skin members for use in boundary layer control and cooling functions.

With the above and such other objects in view as may hereafter more fully appear, the invention consists of novel constructions, combinations and arrangements of parts as will be more fully described and illustrated in the accompanying drawings but it is to be understood that changes, variations and modifications may be resorted to which fall within the scope of the invention.

In the drawings:

FIG. 1 is a chordwise cross sectional view of a portion of an aircraft flight member such as a wing showing features of the instant invention;

FIG. 2 is a cross sectional view of a portion of an aircraft flight component having a skin or wall abutted on its under surface by a fluid conduit containing sheet;

FIG. 3 is a cross sectional view of a modified form of structure of the type shown in FIG. 2;

FIG. 4 is a plan view of an aircraft wing and a portion of the aircraft body showing the provision of spanwise slotted openings in the skin and features of the fluid transfer system; and FIG. 5 is a plan view of an aircraft wing and body portion attached thereto showing the provision of chordwise slotted openings in the skin and features of the fluid transfer system.

Features of the current invention are shown in FIG. 1 which shows an aircraft wing assembly 12 in cross section with the leading and trailing edges of the wing broken away from the view as they do not form part of the invention. The wing 12 is composed of a core 13 made of a plurality of spaced apart wing ribs assembled together by known means. The ribs may be replaced by solid core metal or by a honeycomb structure in accordance with known wing constructions. In FIG. 1, the rib 13 has integrally forged or assembled flanges 14 and 14' extending along the upper and lower surfaces thereof for supporting the outer skins or plates 15 and 21 which respectively define as their outer surfaces, the upper and lower flight surfaces of the wing denoted 18 and 18'. The skin members 15 and 21 are each made of one or more sheets of so called roll-bond material which is made as defined in my said copending application Serial Number 432,924 now U.S. Patent 3,346,220 to contain a plurality of fluid conducting conduit formations 19 which are formed integral with the sheet of metal itself. In FIG. 1, four vein-like conduit formations 19 and denoted 19a, 19b, 19n and 19m are shown extending spanwise along the wing and are each supported by respective deformed portions 14a and 14b of the flanges 14 and 14' along the areas where said formations cross over the wing ribs 13. Notation 16 refers to the non-expanded portions of the skin 15 disposed between the portions thereof which define the conduit formations and which include substantially non-deformed portions 19a' and 19b' of the sheets and outwardly bulging or inflated portions 19a'' and 19b'' which form the walls of the passageways 20 of the conduit formations. Provided in the non-deformed wall portions 19a' and 19b' of the conduit formations 19 of both sheets are a plurality of slotted holes denoted respectively Sa and Sb in the upper skin and Sn and Sm in the lower skin 21. In the embodiment illustrated in FIG. 4 these slotted holes extend spanwise along the wing and are properly dimensioned and spaced to provide suitable boundary layer or heat transfer functions. Notation 13' refers to lightening holes and/or spars through the wing ribs. Headers (not shown) may be provided chordwise along the wing for joining the passageways of a plurality of conduit formations and for conducting fluid thereto or therefrom.

In FIG. 2, the outer surface or flight surface 17 of the wing or flight member comprises a major face of a sheet or plate 22 of metal or other suitable material and a one-side-flat ducted sheet of metal 15' similar in structure to the sheet 15 of FIG. 1 is provided with its flat face 18'' in abutment with the underface 22' of sheet 22. Notation B refers to an adhesive material bonding members 22 and 15' together although the two may also be welded together along their abutting surfaces or selected portions thereof in the manner that welds W are provided between sheet 15 of FIG. 1 and the flanges 14 and 14' of the ribs. Slotted holes 23 of predetermined lengths are provided in member 22 parallel to the conduit formations 19 in sheet 15' and aligned with slotted holes S in the flat wall portions thereof permitting air or other fluids to pass either into the passageway 20 from the boundary layer for effecting control of said boundary layer or out of the passageway for cooling or control purposes.

In FIG. 3 a portion of an aircraft wing or flight member is shown having an outer skin member 24, the outer surface 17 of which defines the flight surface of the wing. A ducted sheets 15' has its flat or non-deformed surface abutting the undersurface of member 24 and is bonded or welded thereto as described. Aligned with the slotted openings S in the conduit portions 19 of ducted sheet 15' are porous strips or filler portions 26 of sheet 24 which permit the passage of fluid as described into or out of the passageways 20 in the ducted sheet. Abutting the deformed surfaces of sheet 15' is shown a honeycomb panel member 27 the walls 27' of which are bonded to and support the sheet 15' and the conduit wall portions thereof. Porous strips 26 may be formed of cellular metal or ceramic formed by sintering particulate material or by other means and are bonded or welded in slotted openings through the skin sheet 24.

FIG. 4 shows an aircraft wing 12a and a portion 30 of the aircraft body to which the wing is attached. The slotted openings S in the wing skin or panel are shown extending spanwise along the wing along substantially the entire upper and lower surfaces thereof but are not drawn to scale or in the manner they may be properly distributed along the wing. Notations 31 and 31' refer to headers located within the wing or cellular portions of the wing itself at the root and wing tip for interconnecting the passageways formed in the ducted sheets as described in alignment with the slotted openings S. Pipings 31a and 31b are connected to the headers 31 and 31' or to individual conduit formations 19 in the ducted sheets forming part of the upper and lower skins or skin assemblies of the wing as described connect said passageways to a device 32 located in the body 30 which device may comprise a vacuum pump for drawing in boundary layer air through the slotted openings S or a source of pressurized heat transfer fluid adapted to be flowed out of the slotted openings S in the wing. The device 32 may also include a portion of the jet engine employed to propel the aircraft through which boundary layer air may be expelled or used in the combustion process.

In FIG. 5, the described slotted openings in the wing skin are intended to serve the hereinbefore defined purposes and are shown extending chordwise along the wing from leading to trailing edges thereof. The size or distribution of the slots are not necessarily drawn to scale in the drawing but it is noted that such variables would be dependent on other variables associated with the aircraft configuration and its operational characteristics and the desired end results which may be determined by one skilled in the art.

As in FIG. 5, notations 28 and 29 refer to the leading and trailing edges of the wing 12b while notations 34 and 35 refer to conduit formations in the sheet or sheets which compose the upper and lower wing skins or subsurface means of FIGS. 2 and 3, which conduit formations are shown extending spanwise near the leading and trailing edges of the wing and join the chordwise conduit formations disposed beneath the slotted holes S' which are chordwise of the wing. Similar conduit formations may be provided spanwise in the sheets forming the wing skins and/or auxiliary conduits or tubes may extend spanwise along the central portion of the wing to connect the chordwise conduit formations with a pump or source of negative pressure which is denoted 36 which may be similar in function to the device 32 of FIG. 4. Tubes or conduits 31c and 31d join headers 34 and 35 respectively to the device 36 for conducting fluid relative thereto.

The one-side-flat, slotted hole containing tubed sheets 15, 21 or 15' as described may be fabricated by roll bonding two sheets of metal such as aluminum, titanium or beryllium together with stop weld material disposed as strip like formations or deposits along the areas thereof to be inflated into conduits and with the described slotted openings 19 either premachined and provided in alignment with the stopweld material or machined as by milling after roll bonding, abutting the surface of the roll bonded sheet which is not slotted against a nonyielding surface such as a die or platen, bringing a resilient pad or blanket to bear against the other surface of the sheet with sufficient force to effect a fluid pressure seal against the slotted openings S and applying fluid pressure to the strip-like, non-welded portions of the sheet to expand the deformed portions (such as 19a'') outwardly from the sheet while maintaining sufficient force against said resilient pad or rubber-like blanket to prevent leakage of the fluid which is used to inflate the sheet conduit formations.

The tubed sheets 15, 15' and 21 may also be fabricated by other means such as by including strips of friable material into a billet and rolling same into a plate or sheet in a rolling mill with said sheet having parallel non bonded interfacially extending strip areas. Sections of the correct lengths of said sheet are then cut to the desired contour and the ends of parallel strip areas clamped off to seal same while the ducted portions 19 thereof are formed by applying suitable fluid pressure to the non-fused interfacial strip volumes. The inflation step may take place before or after the skin is properly fastened, bonded or welded to the upper and/or lower surfaces of the wing frame or core to provide the conduit portions 19 expanded against the corresponding deformed portions 14a, 14b of the wing ribs or the corresponding channels provided in the core of the wing as shown in FIGS. 1 and 3. Thereafter, the slotted holes S may be provided by an automatic milling operation. As it may be required to converge the slotted holes in the skin as shown in FIG. 4 and to provide additional non-parallel conduit formations in the skin as headers or ducts joining adjacent formations, either a plurality of such ducted sheets may be properly contoured and fit together to form the wing upper and lower skins or subsurface ducting or the roll bonding ducted sheet forming process may be employed whereby stopweld material is applied by printing or spraying in any desired pattern which may include patterns for producing headers and joining conduits as shown at 31, 31' and 37 of FIGS. 4 and 5.

The ends of all spanwise extending ducts or conduit formations in the described ducted sheets may be open to a chamber extending chordwise at or near the root of the wing and defined either between two adjacent wing ribs or by cavities in the wing cores. Such chamber may be connected by means of a larger duct or ducts directly to the described fluid pumping means or the jet engine of the aircraft located in the body or the wing or attached to the wing. Similarly, other such chambers may be provided chordwise at different locations along the wing for receiving boundary layer air from the conduit formations by communicating with openings therein.

The interconnection of the conduit formations 19 in the described ducted sheets 15, 15' and 21 with piping or headers may be effected by means such as illustrated in my copending application Ser. No. 304,165 which forms part of the current disclosure. FIG. 19 thereof shows means for connecting a tube to the expanded wall of a ducted sheet of the type provided herein and FIG. 20 shows means for effecting a suitable edgewise connection of a tube with such a conduit formation as 19 of the drawings of the instant invention. Other means may also be provided.

It is noted that sheets 15 and 21 of FIG. 1 may each have a plurality of slotted holes in each wall formation of the ducted portions of the sheet which holes extend for short lengths along the duct formations or parallel to each other for predetermined distances along the sheet. Said holes S may also be defined by or contain porous material of the type shown in FIG. 3 and it is noted that the plate 22 of FIG. 2 may also contain porous material for the purposes described.

It is further noted that the duct containing sheets 15, 15' and 21 of FIGS. 1–3 may be formed by means other than those described such as by rolling or press forming corrugations in one sheet, machining or otherwise providing slotted holes in a second sheet, and laminating or roll bonding the two sheets together with respective slotted holes in the non-corrugated sheet aligned with corrugations in the other to provide the conduit formations 19 illustrated in the drawings and slotted holes extending along proper paths for drawing boundary layer air into the wing and/or passing fluid into the boundary layer adjacent the wing flight surfaces.

In a modified form of the invention two fluid systems may be provided in a single flight component or wing. One of these systems may include means as described for drawing boundary layer air into respective slots and duct formations to reduce drag by reducing turbulence experienced chordwise along the wing or flight component. The other system which may be operative simultaneously with the first described boundary layer drawing system may include means for flowing a liquid heat transfer material through other duct formations and slotted holes in the wing for cooling the aircraft skin during supersonic or hypersonic flight. Or both a suction and positive pressure pumping system may be selectively connected to the same duct formations for selective performing either of the two described fluid flow functions depending on the speed of the aircraft.

Depending on airfoil design, turbulence resulting from boundary layer air flow generally generates rearwardly of the leading edge of the wing and spacing and location of the slotted openings S or S' will be defined in accordance with the wing shape and the manner in which said turbulence is generated and may be affected by drawing boundary layer into the wing.

I claim:

1. An aircraft fluid transfer system comprising in combination:
   an aircraft assembly adapted for flight through the atmosphere including a flight component such as a wing forming part of said aircraft assembly,
   core means defining the internal support for said wing,
   a plurality of sheets of metal joined to said core means and supported thereby,
   each of said sheets having a plurality of integral duct formations formed integrally of the material of the sheets and defined by respective deformed portions of each sheet extending outwardly from a first surface of the sheet and second portions of the sheet which are not distended but are smooth extensions of the adjacent portions of the sheet which do not contain said duct formations,
   means for joining a first surface of each sheet to said core means,
   a plurality of narrow, elongated slotted holes through those portions of the walls of said duct formations of each sheet which are smooth extensions of the adjacent portions of the sheet, said slotted holes adapted to communicate with the boundary layer air adjacent the surfaces of said wing in flight, and
   fluid pumping means communicating with said duct formations in said sheets and operative to cause the flow of fluid through said duct formations and the slotted openings therein relative to the boundary layer air during the flight of said aircraft.

2. An aircraft system in accordance with claim 1 whereby the outer surfaces of said ducted sheets which are not distended comprise the outer covering sheets or skins for said aircraft wing.

3. An aircraft system in accordance with claim 1, said wing having a further sheet material secured to the outer surfaces of said ducted sheets, the outer surfaces of said further sheet material defining the flight surfaces of said wing and a plurality of slotted openings in said further sheet material aligned with said slotted openings in the walls of the duct formations in said sheets.

4. An aircraft system in accordance with claim 1 whereby said duct formations and slotted holes in said ducted sheets extend spanwise of the wing from near the root thereof to near the tip thereof throughout the major portions of the upper and lower surfaces of the wing and said fluid pumping means is operative to create suction for drawing boundary layer air through the slotted openings in the wing to permit a smooth flow of air across the wing in flight and substantially reduce drag, and means for exhausting air drawn into said wing rearwardly from said aircraft.

5. An aircraft system in accordance with claim 1 whereby said duct formations and slotted holes extend chordwise at a plurality of spaced locations along said wing throughout the major portions of the upper and lower wing panels from near the leading edge of the wing to near the trailing edge thereof.

6. An aircraft system in accordance with claim 1 whereby said duct formations in said sheets extend spanwise and closely adjacent each other along substantially the length of the wing exposed to the flight stream, and header means provided near the root of said wing, said header means communicating with the ends of said duct formations, said header means also communicating with said pumping means.

7. An aircraft system in accordance with claim 6, said pumping means being operative to force coolant fluid to said header means and through said duct formations with sufficient pressure to expell said fluid through said slotted openings and outwardly along the flight surfaces of said wing.

8. An aircraft system in accordance with claim 1 whereby said duct formations in said sheets extend spanwise along said wing, there being a chamber formed within said wing near where it joins the body of said aircraft communicating with the passageways defined by said duct formations, said chamber communicating with said pumping means.

9. An aircraft system in accordance with claim 5 including header means extending spanwise along said wing and communicating with the passageways defined by said chordwise extending duct formations, said header means also communicating with said pumping means.

10. An aircraft system in accordance with claim 3, said slotted openings in the walls of said further sheet material having porous material secured therein through which fluid may flow relative to the boundary layer air.

References Cited

UNITED STATES PATENTS

| | | | |
|---|---|---|---|
| 2,742,247 | 4/1956 | Lachmann | 244—130 |
| 2,751,168 | 6/1956 | Stalker | 244—42.47 |
| 2,969,759 | 1/1961 | Giles | 244—130 |
| 3,117,751 | 1/1964 | Rogers et al. | 244—130 |
| 3,261,576 | 7/1966 | Valyi | 244—130 |

MILTON BUCHLER, Primary Examiner

U.S. Cl. X.R.

29—157.3; 244—42